(12) United States Patent
Akhteruzzaman et al.

(10) Patent No.: US 6,823,189 B2
(45) Date of Patent: Nov. 23, 2004

(54) SYSTEM AND METHOD FOR IDENTIFYING MOBILE COMMUNICATION APPARATUSES PROXIMAL WITH AN IDENTIFICATION LOCUS

(75) Inventors: Akhter Akhteruzzaman, Naperville, IL (US); Paul Raymond Sand, Woodridge, IL (US); Richard Grant Sparber, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 519 days.

(21) Appl. No.: 09/768,481

(22) Filed: Jan. 24, 2001

(65) Prior Publication Data

US 2002/0098850 A1 Jul. 25, 2002

(51) Int. Cl.[7] ................................................. H04Q 7/20
(52) U.S. Cl. .............................. 455/456.1; 455/456.3; 455/414.1; 455/404.2; 342/357.07; 342/357.17; 701/207; 340/988
(58) Field of Search .......................... 455/456.1, 456.3, 455/414.1, 404.2; 342/357.01–357.17; 701/207, 208; 340/988, 990

(56) References Cited

U.S. PATENT DOCUMENTS

| | | | |
|---|---|---|---|
| 4,752,951 A | * | 6/1988 | Konneker .............. 379/201.07 |
| 6,343,317 B1 | * | 1/2002 | Glorikian ..................... 709/218 |
| 6,442,394 B1 | * | 8/2002 | Valentine et al. ......... 455/456.3 |
| 6,456,854 B1 | * | 9/2002 | Chern et al. ................. 455/457 |
| 6,526,275 B1 | * | 2/2003 | Calvert ........................ 455/418 |
| 2001/0019960 A1 | * | 9/2001 | Takayama et al. .......... 455/456 |
| 2002/0028681 A1 | * | 3/2002 | Lee et al. .................... 455/456 |
| 2002/0058517 A1 | * | 5/2002 | Furukawa et al. .......... 455/456 |

* cited by examiner

Primary Examiner—Edward F. Urban
Assistant Examiner—Duy K Le

(57) ABSTRACT

A system for identifying at least one selected mobile communication apparatus proximal with an identification locus includes: (a) a mobile communication base facility in communication with a plurality of mobile communication apparatuses that include the selected mobile communication apparatus; (b) at least one location-indicating device emitting a location-indicating code and is installed in each of the selected mobile communication apparatus; the location-indicating code relates a geographic location and an individual identification of a respective selected mobile communication device; and (c) at least one supported unit in communication with the mobile communication base facility. At least one of the mobile communication base facility and the supported unit have on-line access to an information store and a locator. The information store cooperates with the locator in receiving the location-indicating code to relate the individual identification with respective contact data for a respective selected mobile communication device.

20 Claims, 2 Drawing Sheets

SYSTEM AND METHOD FOR IDENTIFYING MOBILE COMMUNICATION APPARATUSES PROXIMAL WITH AN IDENTIFICATION LOCUS

BACKGROUND OF THE INVENTION

The present invention is directed to wireless communication systems. In particular, the present invention is preferably directed to mobile telephone systems.

With the introduction of today's wireless digital telephone systems, such as Time Division Multiple Access (TDMA) and Code Division Multiple Access (CDMA) Personal Communications Service (PCS) systems, communications between a wireless telephone and a nearby base station facility, such as a Mobile Switching Center (MSC)-also sometimes referred to as a Mobile Services Switching Center-are relatively secure from eavesdropping because of the inherent encryption and the frequency hopping operation attendant with operation of such digital telephone systems. Such a resistance to eavesdropping is considered an advantage of digital telephone systems such as the PCS system, but such communication security poses a hindrance to law enforcement officials if the wireless telephone devices are used in the commission of a crime.

By way of example, consider a hostage situation in which hostage takers are using wireless digital telephones to coordinate execution of their criminal activities. In such a situation law enforcement officials may wish to obtain an emergency wiretap order to be able to monitor conversations by the hostage takers on their wireless telephones. If the telephone system used by the hostage takers is a prior art wireless telephone system, law enforcement officials would be handicapped because they find it very difficult to ascertain whether wireless telephones were being used. Even if they could ascertain that wireless telephones were being used, law enforcement officials could not determine the telephone numbers of the wireless telephones being used so that the conversations could be monitored at the MSC. Thus, using prior art wireless telephone systems, wireless calls cannot be easily identified and monitored, and critical information is not be available to law enforcement officials dealing with the situation.

There is a need for a wireless communication system that facilitates identifying mobile communication units proximal with an identification locus, such as within a building in which hostages are held. The system should be amenable to being configured to provide such identification for wireless telephones or other wireless communication devices, such as digital private radio communication devices. Most preferably, the system should identify mobile communication devices in or around an identification area, such as within a particular building, with sufficient specificity to facilitate monitoring communications carried out using the identified communication devices.

SUMMARY OF THE INVENTION

A system for identifying at least one selected mobile communication apparatus proximal with an identification locus includes: (a) a mobile communication base facility in communication with a plurality of mobile communication apparatuses that include the selected mobile communication apparatus; (b) at least one location-indicating device emitting a location-indicating code and is installed in each of the selected mobile communication apparatus; the location-indicating code relates a geographic location and an individual identification of a respective selected mobile communication device; and (c) at least one supported unit in communication with the mobile communication base facility. At least one of the mobile communication base facility and the supported unit have on-line access to an information store and a locator. The information store cooperates with the locator in receiving the location-indicating code to relate the individual identification with respective contact data for a respective selected mobile communication device.

The method includes the steps of: (a) providing: (1) a mobile communication base facility in communication with a plurality of mobile communication apparatuses that include the selected mobile communication apparatus; (2) at least one location-indicating device emitting a location-indicating code and is installed in the selected mobile communication apparatus; the location-indicating code relates a geographic location and individual identification of a respective selected mobile communication device; and (3) at least one supported unit in communication with the mobile communication base facility; (b) configuring: (1) at least one of the mobile communication base facility and the supported unit to have on-line access to an information store and a locator; and (2) the information store to cooperate with the locator in receiving the location-indicating code to relate the individual identification with respective contact data for the respective selected mobile communication device; and (c) displaying the contact data for at least one of the mobile communication base facility and the supported unit.

In its preferred embodiment the system and method of the present invention contemplate configuring mobile communication devices for use with the system with installed locator devices, such as Global Positioning System (GPS) devices, including cell-based GPS devices. Locator devices would preferably provide sufficient resolution of geographic position to determine location of a selected mobile communication device within a few feet. Such fine resolution would suffice to determine whether a given mobile communication device is within a predetermined range of an identification locus with enough accuracy to ascertain whether the mobile communication device being considered is within a particular building or not.

The system and method of the present invention further contemplate providing and operating a data base, or information store, to keep the identity and telephone number (or other access addressing method) on-line for each mobile communication device found proximal with the identification locus. The locator and information store may be available to a mobile communication base facility (e.g., an MSC), or to a supported unit or to both a base facility and one or more supported units. Supported units may include, by way of example and not by way of exclusion, individual police officials equipped with wirelessly communicating Personal Digital Assistant (PDA) type devices, police squad cars or other official vehicles having on-board wirelessly communicating computer terminals, or other law enforcement assets such as emergency service vans, Special Weapon Assault Team (SWAT) vehicles, firetrucks, utility repair vehicles or other assets.

Preferably, the locator and the information store cooperate to match the mobile communication devices to their respective access address (e.g., mobile telephone thus providing appropriate information sufficient to effect a wiretap of conversations carried out using the selected mobile communication device. Such wiretapping, or eavesdropping may be effected, for example, at a Mobile Switching Center (MSC) of a mobile telephone system.

Another advantage provided by the system and method of the present invention is that once a particular geographic area is identified as being involved in, for example, a hostage situation, an MSC may block further calls to that geographic area. Alternatively, phone calls may be blocked to individual mobile communication apparatuses identified as located within the identification area. For example, a service may be provided by an MSC to prevent ringing by mobile phone units that are identified as being located within a movie theater during show times.

Yet another advantage provided by the system and method of the present invention is a capability to configure mobile communication apparatuses to respond to a command from an MSC to activate their respective microphones without any ringing or other alerting indication. With such a feature in place, once particular mobile communication apparatuses are identified as being within an identified geographic area (e.g., a location at which hostages are being held), and once appropriate court authorization is obtained, an MSC may selectively remotely activate microphones of respective mobile communication apparatuses located at the identified geographic area. Such a feature could greatly enhance efforts by supported units in resolving a situation, such as a hostage-taking event, by providing a wider eavesdropping capability than merely monitoring calls made using a tapped mobile communication apparatus.

A further advantage provided by the present invention is that locator devices in respective mobile phones may be used to track movement of respective mobile communication devices, thereby identifying location and phone numbers of likely hostage takers. This is based upon a presumption that hostage takers would presumably be the most mobile phone users in the monitored premises (i.e., proximal with the identification locus).

The present invention may provide still a further advantage by identifying the number of victims involved. Even an indication of the identity of victims may be by their respective mobile telephone numbers. Such information would likely be useful to law enforcement officials in planning an assault of the monitored premises. Still further, movement by the hostage takers may indicate actions that may be taken to separate the hostage takers from the hostages.

In summary, detailed location, movement and identification information in addition to an ability to eavesdrop on telephone conversations and identification of off-site numbers called by hostage takers provide an enormous amount of very useful information not presently available to law enforcement officials using prior art mobile telephone systems.

Similar advantages may be provided by the present invention in situations other than the exemplary hostage situation discussed above. Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
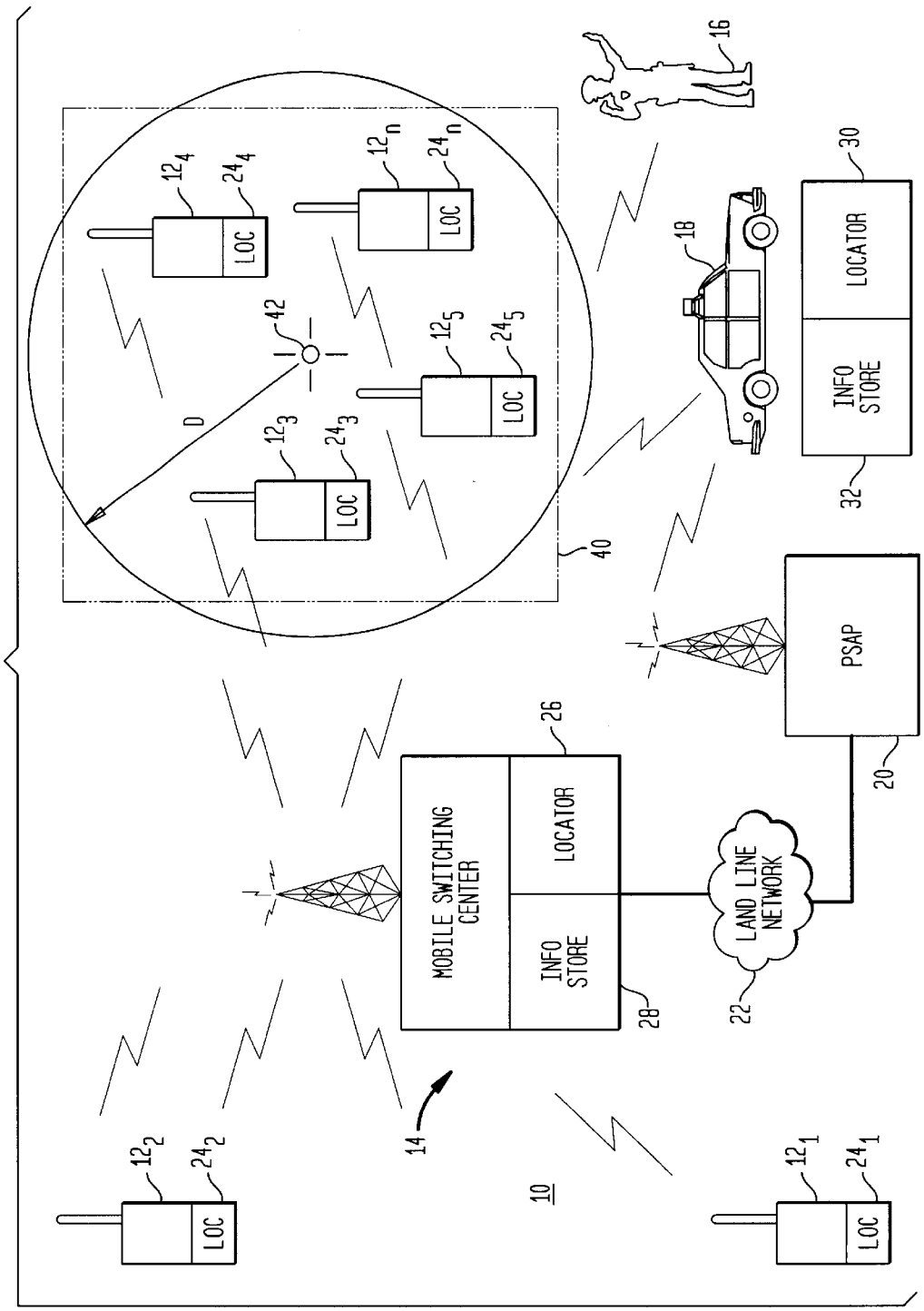
FIG. 1 is a schematic diagram illustrating an exemplary preferred embodiment of the system of the present invention.

FIG. 1 is a schematic diagram illustrating an exemplary preferred embodiment of the system of the present invention. In FIG. 1, a mobile telephone network 10 includes a plurality of mobile communication apparatuses $12_1$, $12_2$, $12_3$, $12_4$, $12_5$, $12_n$, (hereinafter referred to as "mobile communication apparatuses $12_x$") and Mobile Switching Center (MSC) 14. MSC 14 and mobile communication apparatuses $12_x$ represent a mobile telephone network, such as a Personal Communications Service (PCS) or similar mobile telephone network. Also in communication with MSC 14 are units, such as a police official 16 and a police squad car 18. Preferably, police official 16 and squad car 18 communicate with MSC 14 using mobile communication apparatuses (not shown in FIG. 1) similar to mobile communication apparatuses $12_x$. Police official 16 and squad car 18 may also communicate with a Public Safety Answering Position (PSAP) 20 using a private radio network of the sort used for dispatching and reporting by emergency service entities such as police, fire and emergency medical personnel. PSAP 20 may communicate with Mobile Switching Center (MSC) 14 via a landline network 22 representatively illustrated in FIG. 1. An example of a landline network 22 is the Public Switched Telephone Network (PSTN); other publicly accessible networks may also provide alternate link landline network 22 to MSC 14.

Each mobile communication apparatus $12_x$ is provided with a locator unit $24_x$. Thus mobile communication apparatus $12_1$ is provided with a locator unit $24_1$. Mobile communication apparatus $12_2$ is provided with a locator unit $24_2$. Mobile communication apparatus $12_3$ is provided with a locator unit $24_3$. Mobile communication apparatus $12_4$ is provided with a locator unit $24_4$. Mobile communication apparatus $12_5$ is provided with a locator unit $24_5$. Mobile communication apparatus $12_6$ is provided with a locator unit $24_6$. Mobile communication apparatus $12_n$ is provided with a locator unit $24_n$. Mobile communication apparatuses used by police official 16 and squad car 18 are preferably also equipped with locator units (not shown in FIG. 1). Locator units $24_x$ may be any device that determines its own geographic location, preferably within a resolution of a few feet, and is compatible with its respective host mobile communication apparatus $12_x$ to transmit a location message indicating geographic location of its host mobile communication apparatus $12_x$ to MSC 14. A preferred embodiment of a locator unit $24_x$ is a Global Positioning System (GPS) unit.

Preferably, respective mobile communication apparatuses $12_x$ cooperate with their respective locator units $24_x$ to transmit geographic location information and identification information to establish which respective mobile communication apparatus $12_x$ is located at a particular geographic location. Such location-identification information may be transmitted constantly, periodically or in response to a query from MSC 14. An example of identification information that may be transmitted as part of the location-identification information is the Electronic Serial Number (ESN) of the respective mobile communication apparatus $12_x$.

Mobile Switching Center (MSC) 14 includes a locator unit 26 that is compatible with locator units $24_x$ so that MSC 24 may use locator unit 26 to "understand" location messages received from various locator units $24_x$ in terms of the geographic location information conveyed by the various location messages. MSC 14 further includes an information store 28. Information store 28 is preferably configured to cooperate with locator unit 26 to relate individual location messages from respective locator units $24_x$ with identification information relating to respective mobile communication units $12_x$. Thus, by way of example, a location message received from locator unit $24_x$ will be used in cooperation with information stored in information store 28 to provide a mobile telephone number for mobile communication apparatus $12_1$.

Moreover, MSC 14 preferably has available a mapping function that allows plotting location information received from various locator units $24_x$ on a map (not shown in FIG. 1). Such map information may, for example, be stored in locator unit 26 or in information store 28.

Police official 16 may be equipped with a wireless communication capable Personal Digital Assistant (PDA) or similar device to enable provision of a mobile locator unit 30 and mobile information store 32 for police official 16. Similarly, squad car 18 may be equipped with a wireless communication capable Personal Digital Assistant (PDA), or a wireless communication capable on-board computer device or a similar device to enable provision of a mobile locator unit 30 and mobile information store 32 for squad car 18. Mobile locator unit 30 and mobile information store 32 are indicated representatively in FIG. 1 in solid lines to show that such equipping is an alternative available with the present invention that is within the intended scope of the system and method of the invention. Similar arrangements and equipment may be provided for other supported units (not shown in FIG. 1) such as emergency medical vehicles, Special Weapons Assault Team (SWAT) vehicles, firefighting vehicles, public utility repair vehicles or other units.

When the system of the present invention includes mobile locator units 30 and mobile information stores 32, on-scene personnel associated with supported units such as police official 16 and squad car 18 have current information to deal with extant conditions. Mobile information stores 32 may be deployed for equipping supported units such as police official 16 and squad car 18 without mobile locator units 30. In such a configuration, mobile communication network 10 or emergency service communications from PSAP 20 may be employed to periodically update information in mobile information store(s) 32 for display to and use by supported units.

Consider a hostage situation by way of example, and not by way of exclusion of alternatives. Hostages may be held in a building having a building perimeter indicated by dotted line 40 in FIG. 1. Police official 16 and squad car 18 (hereinafter referred to as supported units 16, 18) may query Mobile Switching Center (MSC) 14 to determine whether there are any mobile communication apparatuses $12_x$ within building perimeter 40. MSC 14 may employ locator unit 26 and information store 28 to ascertain which mobile communication apparatuses $12_x$ are within a predetermined distance D from an identification locus 42. When locator units $24_x$ and 26 are GPS units, determination of location may be made to within a few feet in terms of latitude and longitude. Whatever system of locator units $24_x$, 26 is employed, MSC 14 may determine which mobile communication apparatuses $12_x$ are within building perimeter 40 and, further, can identify respective telephone numbers for each of the mobile communication apparatuses $12_x$ that are within building perimeter 40. Alternatively, a street address may be selected at MSC 14 or at a supported unit 16, 18 and locators $2_x$, 26, 30 and information stores 28, 32 may cooperate to determine which mobile communication apparatuses $12_x$ are within building perimeter 40. Knowing such information, police officials may seek a wiretap authorization and effect wiretap eavesdropping on mobile communication apparatuses $12_x$ within building perimeter 40. Moreover, MSC 14 may monitor phone calls made by mobile communication apparatuses $12_x$ within building perimeter 40 to outside call recipients. Identification of telephone number information relating to calling mobile communication apparatuses and to called numbers may aid identifying personnel involved in the hostage situation, whether as hostage taker or as victim.

Monitoring movement of respective mobile communication apparatuses $12_x$ within building perimeter 40 may aid in determining which mobile communication apparatuses $12_x$ within building perimeter 40 are used by hostages (relatively less movement) and which mobile communication apparatuses $12_x$ within building perimeter 40 are being used by hostage takers (relatively more movement).

Such a tracking capability combined with the capability to combine location information with map information provides police officials with knowledge regarding where individual communicating units are located within a building and enables displaying that information on a map or even a blueprint of the building. Monitoring movement and other characteristics of individual communication apparatuses $12_x$ in the monitored premises can provide much useful information for police officials relating to identity of hostage takers, identity of hostages, locations of individual hostage takers and hostages, when hostages and hostage takers may be separated and numerous other informational items not available to police officials not having access to the present invention.

Figure 2:
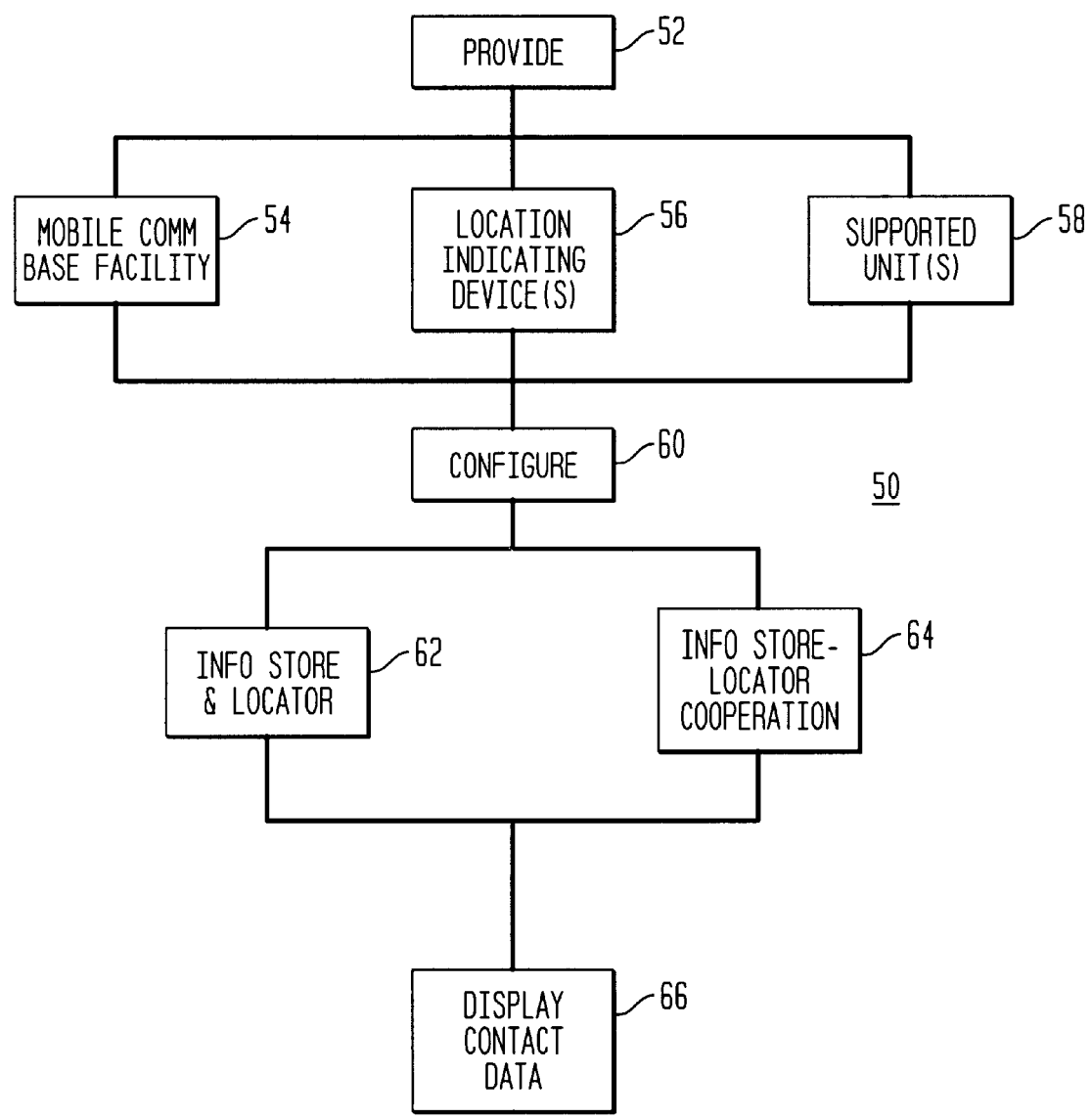
FIG. 2 is a schematic flow diagram illustrating the preferred embodiment of the method of the present invention.

FIG. 2 is a schematic flow diagram illustrating the preferred embodiment of the method of the present invention. In FIG. 2, a method 50 for identifying at least one selected mobile communication apparatus proximal with an identification locus begins with providing, as indicated by a block 52, a mobile communication base facility, as indicated by a block 54; at least one location-indicating device, as indicated by a block 56; and at least one supported unit, as indicated by a block 58. The providing according to blocks 52, 54, 56, 58 is effected in no particular order. The mobile communication base facility provided according to block 54 is in communication with a plurality of mobile communication apparatuses. The plurality of mobile communication apparatuses includes at least one selected mobile communication apparatus.

The at least one location-indicating device provided according to block 56 emits a location-indicating code. A respective location-indicating device is installed at least in each of the selected mobile communication apparatuses. The location-indicating code relates a geographic location and an individual identification of a respective one of the selected mobile communication apparatuses. The at least one supported unit provided according to block 58 is in communication with the mobile communication base facility.

Method 50 continues with configuring, as indicated by a block 60, at least one of the mobile communication base facility and the at least one supported unit to have on-line access to an information store and a locator, as indicated by a block 62. Further according to block 60, method 50 configures the information store to cooperate with the locator in receiving the location-indicating code to relate the individual identification with respective contact data for the respective selected communication apparatuses, as indicated by a block 64. The configuring according to blocks 62, 64 is effected in no particular order.

Method 50 continues, as indicated by a block 66, with displaying the contact data for at least one of the mobile base facility and at least one supported unit.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for identifying at least one selected mobile communication apparatus within a geographic area; the system comprising:
   (a) a mobile communication base facility in communication with a plurality of mobile communication apparatuses; said plurality of mobile communication apparatuses including said at least one selected mobile communication apparatus;
   (b) at least one location-indicating device emitting a location-indicating code; a respective location-indicating device being installed at least in each of said at least one selected mobile communication apparatus; said location-indicating code relating a geographic location and an individual identification of a respective said at least one selected mobile communication apparatus;
   (c) at least one supported unit; said at least one supported unit being in communication with said mobile communication base facility and having a first locator;
   (d) a second locator in communication with said mobile communication base facility and configured to ascertain which of said selected mobile communication apparatuses are within a predetermined distance from an identification locus with said geographic area;
   (e) said mobile communication base facility and said at least one supported unit having on-line access to an information store; said information store cooperating with said locator in receiving said location-indicating code to relate said individual identification with respective contact data for said respective at least one selected mobile communication apparatus and
   (f) said mobile communication base facility is operative to block calls to said selected mobile communication apparatuses within the predetermined distance from the identification locus.

2. The system as recited in claim 1 wherein said at least one supported unit and said mobile communication base facility are in communication via a wireless telephone network.

3. The system as recited in claim 1 wherein said at least one supported unit and said mobile communication base facility are in communication via a land line telephone network.

4. The system as recited in claim 3 wherein said at least one supported unit and said mobile communication base facility are also in communication via a wireless telephone network.

5. The system as recited in claim 1 wherein said information store and said locator further cooperate to register said geographic location with an on-line map indicating said identification locus.

6. The system as recited in claim 5 wherein at least one of said mobile communication base facility and said at least one supported unit further has on-line access to a display for providing graphic indications of said geographic location.

7. The system as recited in claim 6, wherein said at least one supported unit and said mobile communication base facility are in communication via a wireless telephone network.

8. The system as recited in claim 6 wherein said at least one supported unit and said mobile communication base facility are in communication via a land line telephone network.

9. The system as recited in claim 8 wherein said at least one supported unit and said mobile communication base facility are also in communication via a wireless telephone network.

10. The system as recited in claim 1 wherein at least one of said mobile communication base facility and said at least one supported unit further has on-line access to a display for providing graphic indications of said geographic location.

11. A method for identifying at least one selected mobile communication apparatus within a geographic area; the method comprising the steps of:
   providing, in no particular order:
      a mobile communication base facility in communication with a plurality of mobile communication apparatuses; said plurality of mobile communication apparatuses including said at least one selected mobile communication apparatus;
      at least one location-indicating device emitting a location-indicating code; a respective location-indicating device being installed at least in each of said at least one selected mobile communication apparatus; said location-indicating code relating a geographic location and an individual identification of a respective said at least one selected mobile communication apparatus;
      at least one supported unit; said at least one supported unit being in communication with said mobile communication base facility and having a first locator unit; and
      a second locator in communication with said mobile communication base facility;
   configuring, in no particular order:
      said second locator to ascertain which of said selected mobile communication apparatuses are within a predetermined distance from an identification locus with said geographic area;
      said mobile communication base facility and said at least one
      supported unit to have on-line access to an information store;
      said information store to cooperate with said locator in receiving said location-indicating code to relate said individual identification with respective contact data for said respective at least one selected mobile communication device and
      said mobile communication base facility to block calls said selected mobile communication apparatuses within the predetermined distance from the identification locus;
   displaying said contact data for at least one of said mobile communication base facility and said at least one supported unit.

12. The method as recited in claim 11 wherein said at least one supported unit and said mobile communication base facility are in communication via a wireless telephone network.

13. The method as recited in claim 11 wherein said at least one supported unit and said mobile communication base facility are in communication via a land line telephone network.

14. The method as recited in claim 13 wherein said at least one supported unit and said mobile communication base facility are also in communication via a wireless telephone network.

15. The method as recited in claim 11 wherein said information store and said locator further cooperate to register said geographic location with an on-line map indicating said identification locus.

16. The method as recited in claim 11 wherein at least one of said mobile communication base facility and said at least one supported unit further has on-line access to a display for providing graphic indications of said geographic location.

17. The method as recited in claim 16 wherein at least one of said mobile communication base facility and said at least one supported unit further has on-line access to a display for providing graphic indications of said geographic location.

18. The method as recited in claim 17, wherein said at least one supported unit and said mobile communication base facility are in communication via a wireless telephone network.

19. The method as recited in claim 17 wherein said at least one supported unit and said mobile communication base facility are in communication via a land line telephone network.

20. The method as recited in claim 19 wherein said at least one supported unit and said mobile communication base facility are also in communication via a wireless telephone network.

* * * * *